(12) United States Patent
Todani

(10) Patent No.: US 8,305,696 B2
(45) Date of Patent: Nov. 6, 2012

(54) INNER FOCUSING ZOOM LENS

(75) Inventor: Satoshi Todani, Saitama (JP)

(73) Assignee: Tamron Co., Ltd., Saitama (JP)

(*) Notice: Subject to any disclaimer, the term of this patent is extended or adjusted under 35 U.S.C. 154(b) by 106 days.

(21) Appl. No.: 12/318,592

(22) Filed: Dec. 31, 2008

(65) Prior Publication Data
US 2010/0033845 A1 Feb. 11, 2010

(30) Foreign Application Priority Data

Aug. 8, 2008 (JP) ................................ 2008-206017

(51) Int. Cl.
G02B 7/02 (2006.01)
G02B 15/14 (2006.01)

(52) U.S. Cl. ......... 359/701; 359/694; 359/822; 359/823

(58) Field of Classification Search .................. 359/819, 359/822–830, 694, 699, 701
See application file for complete search history.

(56) References Cited

U.S. PATENT DOCUMENTS

| 5,172,276 A * | 12/1992 | Ueyama et al. ............... 359/813 |
| 6,754,011 B2 | 6/2004 | Todani |
| 2008/0198480 A1* | 8/2008 | Todani et al. ................. 359/700 |

FOREIGN PATENT DOCUMENTS

| JP | 08-304684 A | 11/1996 |
| JP | 2000-089086 A | 3/2000 |
| JP | 2003-279835 A | 10/2003 |
| JP | 2007-079241 A | 3/2007 |
| JP | 2008-152049 A | 7/2008 |

* cited by examiner

*Primary Examiner* — Ricky Mack
*Assistant Examiner* — Mahidere Sahle
(74) *Attorney, Agent, or Firm* — Jacobson Holman PLLC (57) ABSTRACT

The present invention is directed to an improved inner focusing zoom lens barrel that implements a zoom ratio as high as 15×±α and that ensures a well-balanced cam configuration for the smooth zooming and focusing. The inner focusing zoom lens barrel includes a fixed barrel; a focusing cam barrel, a linear shuttle barrel, and a first cam barrel laid one over another in this order inside the fixed barrel; and a zoom linkage ring, a second cam barrel, and a 1st-lens-group sliding barrel laid one over another in this order outside the fixed barrel.

5 Claims, 11 Drawing Sheets

PRIOR ART

FIG.11

PRIOR ART

INNER FOCUSING ZOOM LENS

FIELD OF THE INVENTION

The present invention relates to an inner focusing zoom lens barrel, and more particularly, it relates to an inner focusing zoom lens barrel suitable for inner focusing zoom lenses that is capable of attaining a zoom ratio of as high as 15×±α.

BACKGROUND ART

Inner focusing lenses of high zoom ratio usually have an increased variation rate of a displacement of a focusing lens upon close-up photoshooting at a minimum objective distance from the leading end of the lens to the subject, and an attempt to raise a close-up performance at the minimum objective distance by means of a single focusing cam member causes focus to change greatly in the remaining zooming ranges, resulting in varifocal. Focusing cam curves, which perform a varifocal-zooming conversion, must be deliberately designed for appropriate zooming and focusing parameters. However, this leads to difficulties in ensuring a well-balanced cam configuration for the smooth zooming and focusing, and a curvature of focusing cams must be changed, or some other compensation must be made with the focusing cams.

In the prior art high zoom ratio lenses, the focusing lens is simultaneously rotated and displaced forward and backward during either the zooming or the focusing. Typically, guide grooves are defined in the focusing cam barrel to serve as cams along with pins fitted in the guide grooves to slide and trace in the guide grooves of the focusing cam barrel, which permits rotary components to turn for the focusing. During the zooming, the rotary components turn along the focusing cam barrel in bi-directions that determine an operable range of the focusing cams to adjustably obtain an appropriate displacement of the focusing lens (see Patent Document 1 listed below).

However, it is still harder to determine the operable range of the focusing cams so as to ensure the appropriate displacement of the focusing lens as well as the further enhanced close-up performance at the minimum objective distance without focal change in the entire zooming range. The zoom lenses of zooming ratio as high as 5×±α are typically of 5-layer configuration where a first cam barrel is inside a fixed barrel while a second cam barrel, a linear shuttle cam barrel, and a third cam barrel are disposed outside the fixed barrel one over another, and with such a configuration, the zoom lenses cannot reduce a diameter any longer. Such zoom lenses do not allow for anti-shake or image stabilization mechanism incorporated therein.

Some of the prior art high zoom ratio lenses have focus compensating cams and focusing cams disposed in the same rotary component to attain the desired displacement of the focusing lens (see Patent Document 2 listed below). However, such zoom lenses are typically configured so that the focusing lens is linearly moved during the zooming, and therefore, the zooming operation is simply adjusted by a fixed amount of compensation in any segment of the zooming range, which results in the compensation is insufficient to reduce the objective distance for the close-up photoshooting. In addition, this type of the high zoom ratio lenses encounter a problem that an outer diameters cannot reduce any longer because of their 5-layer configuration having first and second cam barrels, a linear shuttle barrel, and a third cam barrel outside a fixed barrel. This type of the zoom lenses do not allow for anti-shake or image stabilization mechanism incorporated therein.

Figure 10:
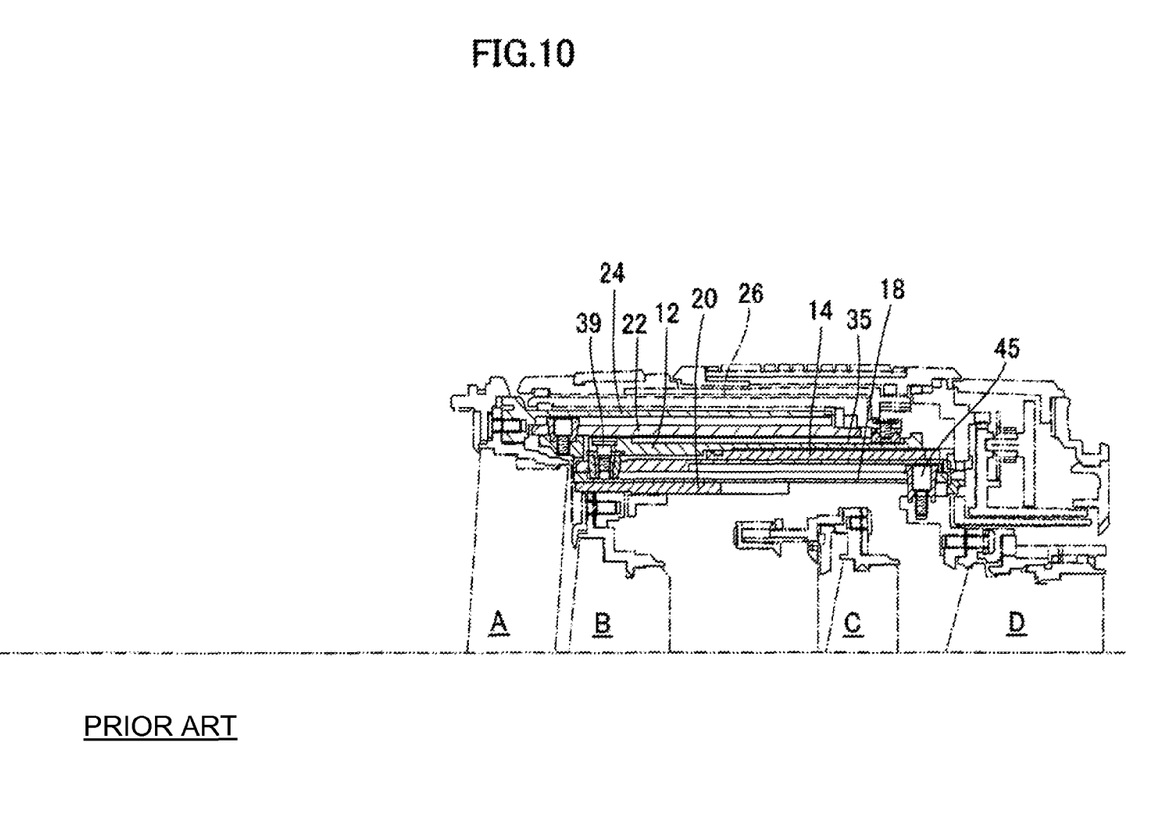
FIG. 10 is a partial sectional view showing a prior art inner focusing zoom lens upon wide-angle view shooting.
Figure 11:
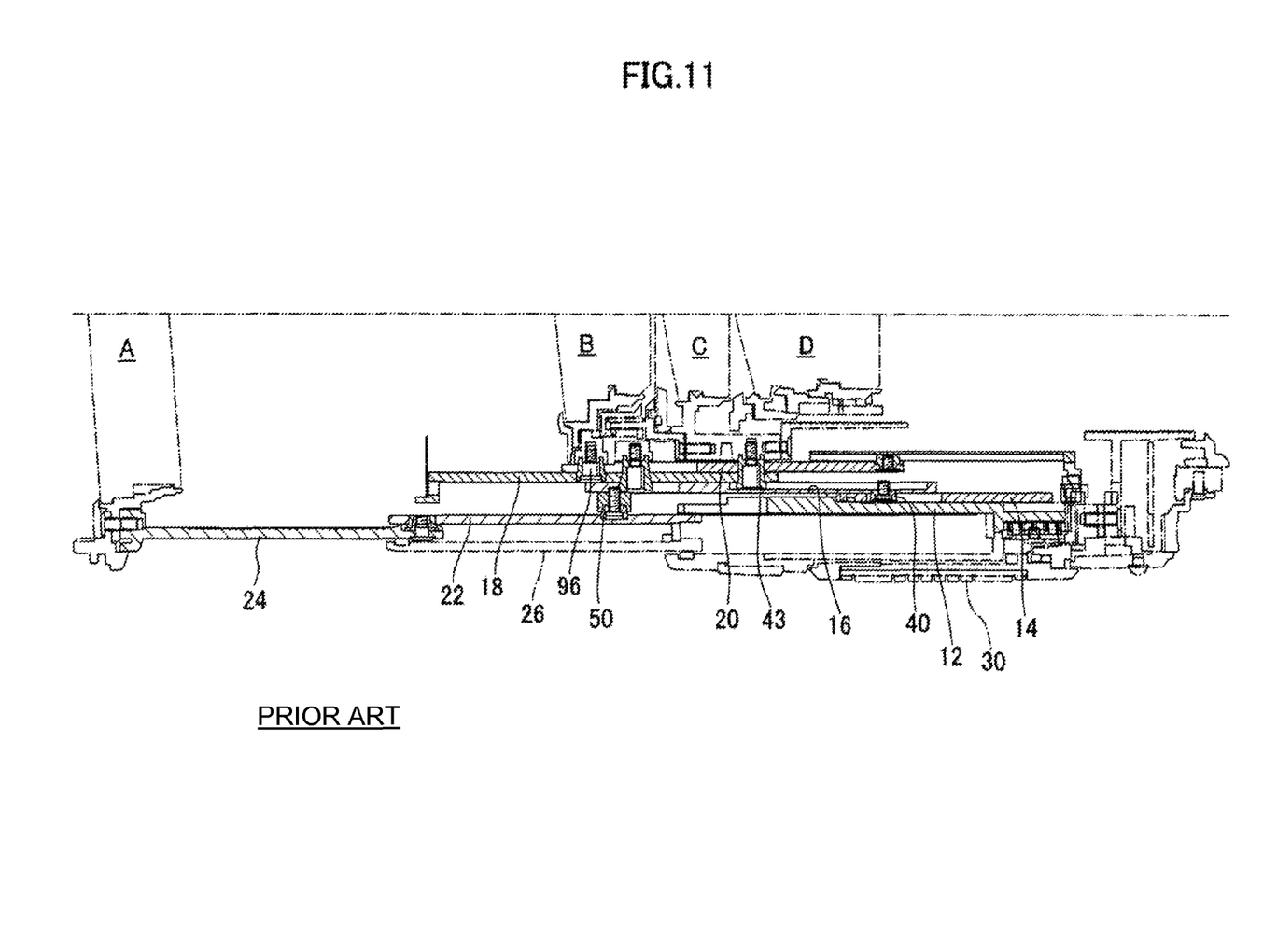
FIG. 11 is a partial sectional view showing the prior art inner focusing zoom lens upon telephoto view shooting.

Some other prior art high zoom ratio lenses include, as shown in FIGS. 10 and 11, a zoom linkage ring 14 inside a fixed barrel 12, a first cam barrel 16 inside the zoom linkage ring 14, a linear shuttle barrel 18 inside the first cam barrel 16, and a focusing cam barrel 20 inside the linear shuttle barrel 18. The first cam barrel 16 is engaged with the zoom linkage ring 14 with zoom linkage studs 40 intervening therebetween so that rotation of the zoom ring 30 can be transmitted to the first cam barrel 16. The first cam barrel 16 has 1st-cam-barrel guide cams with guide studs 39 used to move the first cam barrel along the optical axis, 3rd-lens-group guide cams with 3rd-lens-group guide studs 43 operatively fitted therein, and 4th-lens-group guide cams with 4th-lens-group guide studs 45 operatively fitted therein. The first cam barrel 16 also has 2nd-cam-barrel linkage studs 50 protruding outward at the leading end of the fixed barrel 12 opposite to a lens mount 10. The 2nd-cam-barrel linkage studs 50 are operatively fitted in longitudinal guide grooves defined in the second cam barrel 22 (see Patent Document 3 listed below).

In the above-mentioned high zoom ratio zoom lenses, the zoom linkage ring 14 is attached inside of the fixed barrel 12, the first cam barrel 16 is disposed inside the zoom linkage ring 14, and the linear shuttle barrel 18 is disposed inside the first cam barrel 16. The zoom linkage studs 40 couple the first cam barrel 16 with the zoom linkage ring 14 so as to transmit the rotation of the zoom 30 to the first cam barrel 16. In order to make the first cam barrel 16 move along the optical axis, the first cam barrel 16 has to be provided with the 1st-cam-barrel guide cams engaged with the 1st-cam-barrel guide studs 30, the 3rd-lens-group guide cams engaged with the 3rd-lens-group guide studs 43, and the 4th-lens-guide cams engaged with the 4th-lens-group guide studs 45.

However, the first cam barrel 16 is restricted in its entire extension along the optical axis, and this results in the 1st-cam-barrel guide cams, the 3rd-lens-group guide cams, and the 4th-lens-group guide cams being restricted in their respective entire extensions along the optical axis. Especially, in order to raise a zoom ratio, the third and fourth groups of lenses among others succeeding to the first and the second must respectively be given a greater stroke along the optical axis, but it is hard to accomplish a well-balanced adjustment among the guide cams within the restricted dimension of the first cam barrel 16 extending along the optical axis. In other words, there is no compromised solution in forced arrangement of the guide cams, and if there were, the guide cams are restricted more in their relative configurations and positions without freedom and idleness of design.

Moreover, as for an available entire extension of the fixed barrel 12, a stroke of the linear shuttle barrel 18 is increased as a displacement of the third group of lenses is increased, and this leads to another problem of losing a steady fitting-hold or anchor-hold of the linear shuttle barrel 18 on the fixed barrel 12 during displacing the linear shuttle barrel for the telephoto-shooting to eventually lose the required stability of the lens barrel. Additionally, this type of the zoom lenses do not allow for anti-shake or image stabilization mechanism incorporated therein.

On the other hand, at an attempt to configure a lens barrel so that its radial dimensions can be reduced, there has been developed a lens barrel having a shake-compensating unit and a lens frame holding lens pieces both of which are included as at least part of a photoshooting optics, and such a improved lens barrel has a restrictor located in the shake compensating unit so as to restrict rotation of the lens frame (see Patent Document 4).

Patent Document 1:
Japanese Patent Preliminary Publication No. H8-304684
Patent Document 2:
Japanese Patent Preliminary Publication No. 2000-89086
Patent Document 3:
Japanese Patent No. 3689379
Patent Document 4:
Japanese Patent Preliminary Publication No. 2007-79241

The present invention is made to overcome the aforementioned disadvantages in the prior art zoom lens barrel, especially, the prior art inner focusing zoom lens barrel, and accordingly, it is an object of the present invention to provide an improved inner focusing zoom lens barrel that implements a zoom ratio as high as 15×±α and that ensures a well-balanced cam configuration for the smooth zooming and focusing and facilitates to incorporate anti-shake mechanism.

It is another object of the present invention to provide an inner focusing zoom lens barrel that is capable of attaining a sufficient close-up performance at the minimum objective distance from the leading end of the zoom lens barrel to the subject and of minimizing change in focus throughout the entire zooming range and that is reduced in its outer diameter.

It is further another object of the present invention to provide an inner focusing zoom lens barrel that is imposed reduced restrictions on configurations and positions of guide cams and that keeps a steady fitting-hold or anchor-hold of a linear shuttle barrel on a fixed barrel during displacing the linear shuttle barrel for the telephoto-shooting to eventually retain the required stability of the lens barrel.

SUMMARY OF THE INVENTION

The present invention provides an inner focusing zoom lens barrel that has a fixed barrel; a focusing cam barrel, a linear shuttle barrel, and a first cam barrel laid one over another in this order inside the fixed barrel; and a zoom linkage ring, a second cam barrel, and a 1st-lens-group sliding barrel laid one over another in this order outside the fixed barrel.

The present invention also provides an inner focusing zoom lens barrel that has a fixed barrel; a focusing cam barrel, a linear shuttle barrel, and a first cam barrel laid one over another in this order inside the fixed barrel; a zoom linkage ring, a second cam barrel, and a 1st-lens-group sliding barrel laid one over another in this order outside the fixed barrel; and a lens system comprised of a first group of lens pieces of positive refractivity, a second group of lens pieces of negative refractivity serving as a focusing lens, a third group of lens pieces of positive refractivity, and a fourth group of lens pieces of positive refractivity disposed in this order from the closest to the subject where as magnification changes from the wide-angle view to the telephoto view, the first lens group and the second lens group are separated farther from each other, the second lens group and the third lens group are moved closer to each other, and the third lens group and the fourth lens group are also moved closer to each other; the trailing lens pieces in third lens group being moved so as to be perpendicular to the optical axis, thereby enabling compensation for an unstable imaging plane due to a little jerk(s) of the hand(s).

In one aspect of the present invention, the inner focusing zoom lens barrel can attain a zoom ratio as high as 15×±α, and has cam configurations well-balanced for the smooth zooming and focusing as well as anti-shake or image-stabilization mechanism easily incorporated therein.

In another aspect of the present invention, the inner focusing zoom lens barrel can attain a sufficient close-up performance at the minimum objective distance from the leading end of the zoom lens barrel to the subject and minimize change in focus throughout the entire zooming range, and is reduced in its outer diameter.

In still another aspect of the present invention, the inner focusing zoom lens barrel is imposed reduced restrictions on configurations and positions of guide cams and can keep a steady fitting-hold or anchor-hold of a linear shuttle barrel on a fixed barrel during displacing the linear shuttle barrel for the telephoto-shooting to eventually retain the required stability of the lens barrel.

DETAILED DESCRIPTION OF THE INVENTION

A best mode of an inner focusing zoom lens barrel according to the present invention will now be described in conjunction with the drawings.

<Lens Barrel Configuration>

Figure 1:
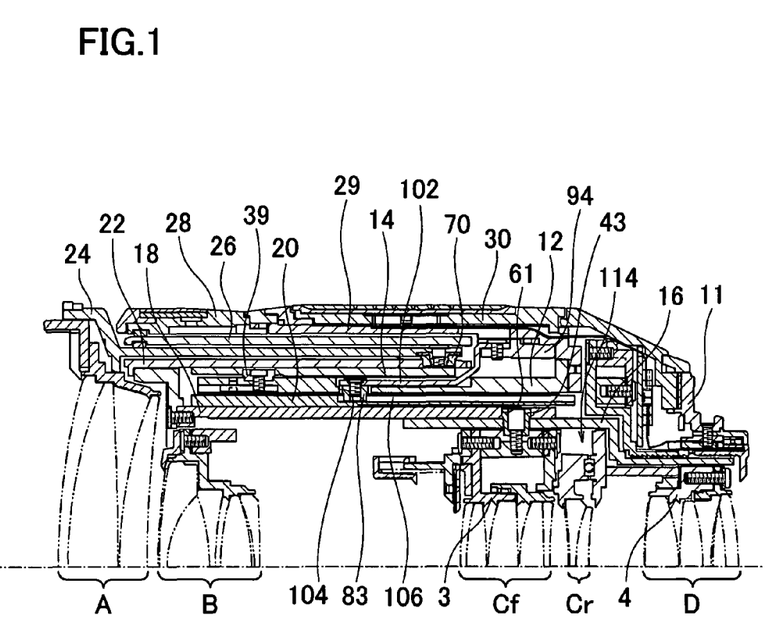
FIG. 1 is a partial sectional view showing an embodiment of an inner focusing zoom lens upon wide-angle view shooting according to the present invention.
Figure 2:
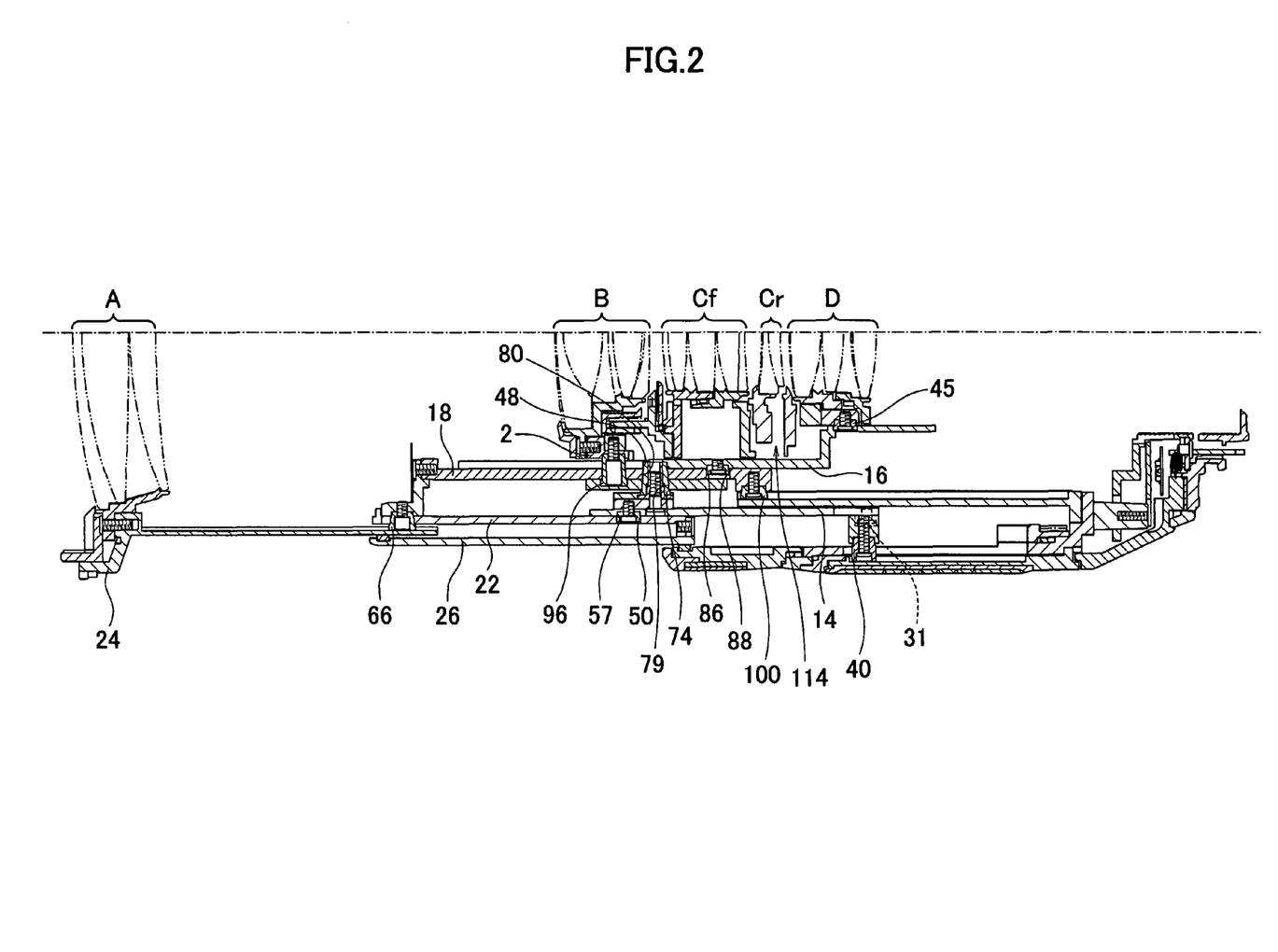
FIG. 2 is a partial sectional view showing the embodiment of the inner focusing zoom lens upon telephoto view shooting according to the present invention.

An inner focusing zoom lens barrel 10 of 18-270 mm focal length includes, as shown in FIG. 1 and FIG. 2, a first group of lens pieces A (focal length+108 mm), a second group of lens pieces B (focal length−13 mm), a third group of lens pieces C (focal length+45 mm), and a fourth group of lens pieces D (focal length+48 mm) attached as a single unit. The third lens group C has the leading lens pieces Cf (focal length+27 mm), and the trailing lens pieces Cr (focal length−40 mm) that are, for the purpose of anti-shake or image stabilizing, shifted so as to be perpendicular to the optical axis. The zoom lens barrel 10 has a fixed barrel 12 integrated with a mount 11 that is used for attachment to a camera body (not shown).

The fixed barrel 12 has its inner side overlaid with a focusing cam barrel 20 and a linear shuttle barrel 18, the latter being inside the former. The linear shuttle barrel 18 has its inner side overlaid with a first cam barrel 16, and further inside the same, there are a 2nd-lens-group holding frame 2, a 3rd-lens-group holding frame 3 and a 4th-lens-group holding frame 4 disposed one over another. The 3rd-lens-group holding frame 3 is held by an anti-shake member 114. The 3rd- and 4th-lens-group holding frames 3, 4 are coupled to each other by 4th-lens-group linear guide keys 112 so that they do not rotate about the optical axis relative to each other but can come apart from and close to each other along the optical axis.

The fixed barrel 12 has its outer side overlaid with a zoom linkage ring 14, a second cam barrel 22, and a 1st-lens-group sliding frame 24 disposed one over another in this order. Outside the 1st-lens-group sliding frame 24, an outer armor barrel 26, a zooming ring 30, and a focusing ring 28 are exposed. The fixed barrel 12 is further superposed with an intermediate lens barrel 29 integrated with it, and a focus linkage plate 102 secured to the focusing ring 28. The focus linkage plate 102 has its leading end (i.e., opposite to the mount 11) provided with focus linkage studs 83 that pass through clearances or through-holes 104 defined in the fixed barrel 12 so as to fit in focus cam grooves 106.

Figure 3:
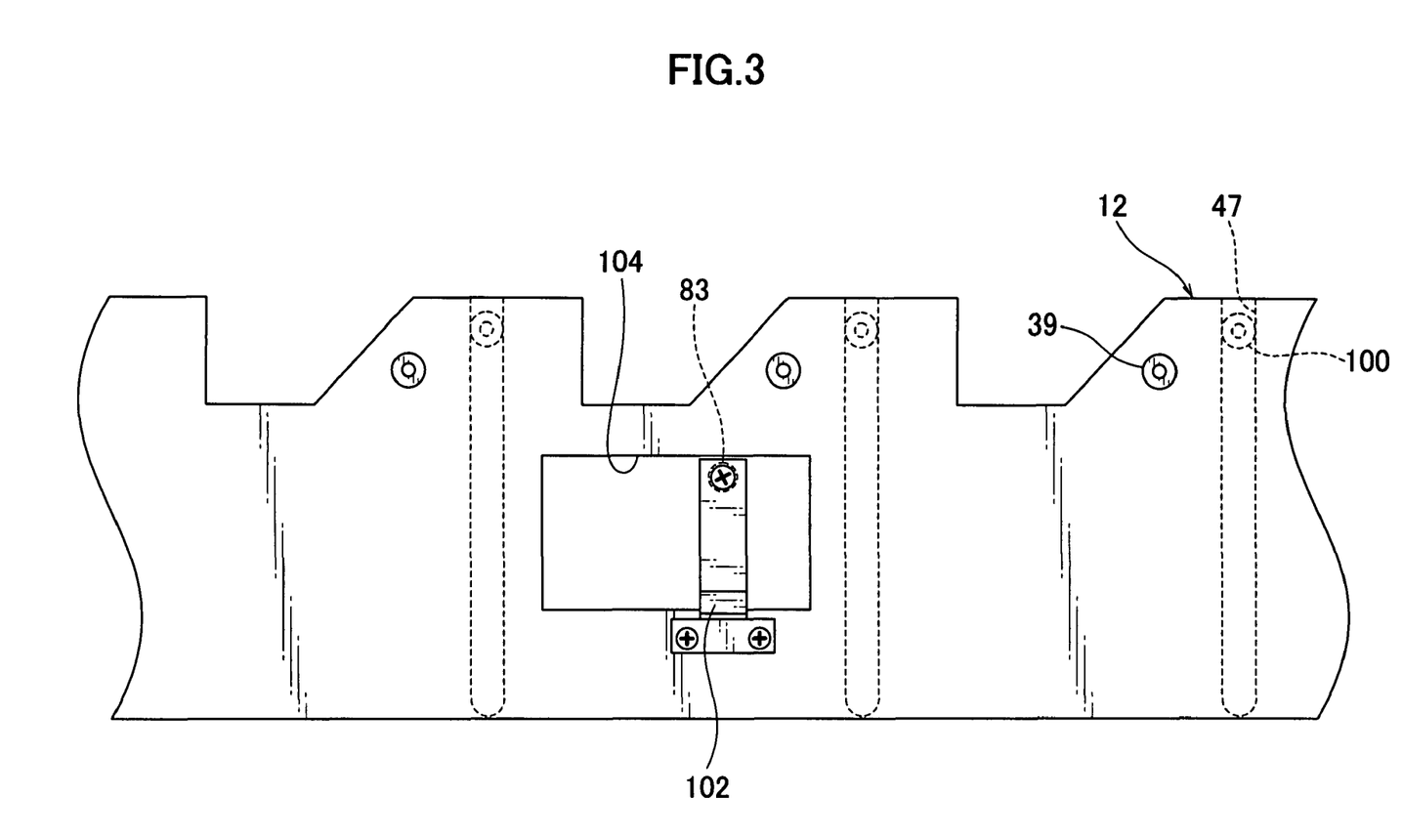
FIG. 3 is a view illustrating an exemplary fixed barrel according to the present invention, opened along a diameter and compressed.

FIG. 3 depicts the fixed barrel 12 having the clearances or through-holes 104 which the focus linkage studs 83 implanted in the focus linkage plate 102 extend through. The fixed barrel 12 has linear guide grooves 47 defined in its inner surface so that guide studs 100 implanted in the linear shuttle barrel 18 are operatively fitted in the guide grooves 47. Also, the fixed barrel 12 has 1st-cam-barrel guide studs 39 implanted in its outer surface.

Figure 4:
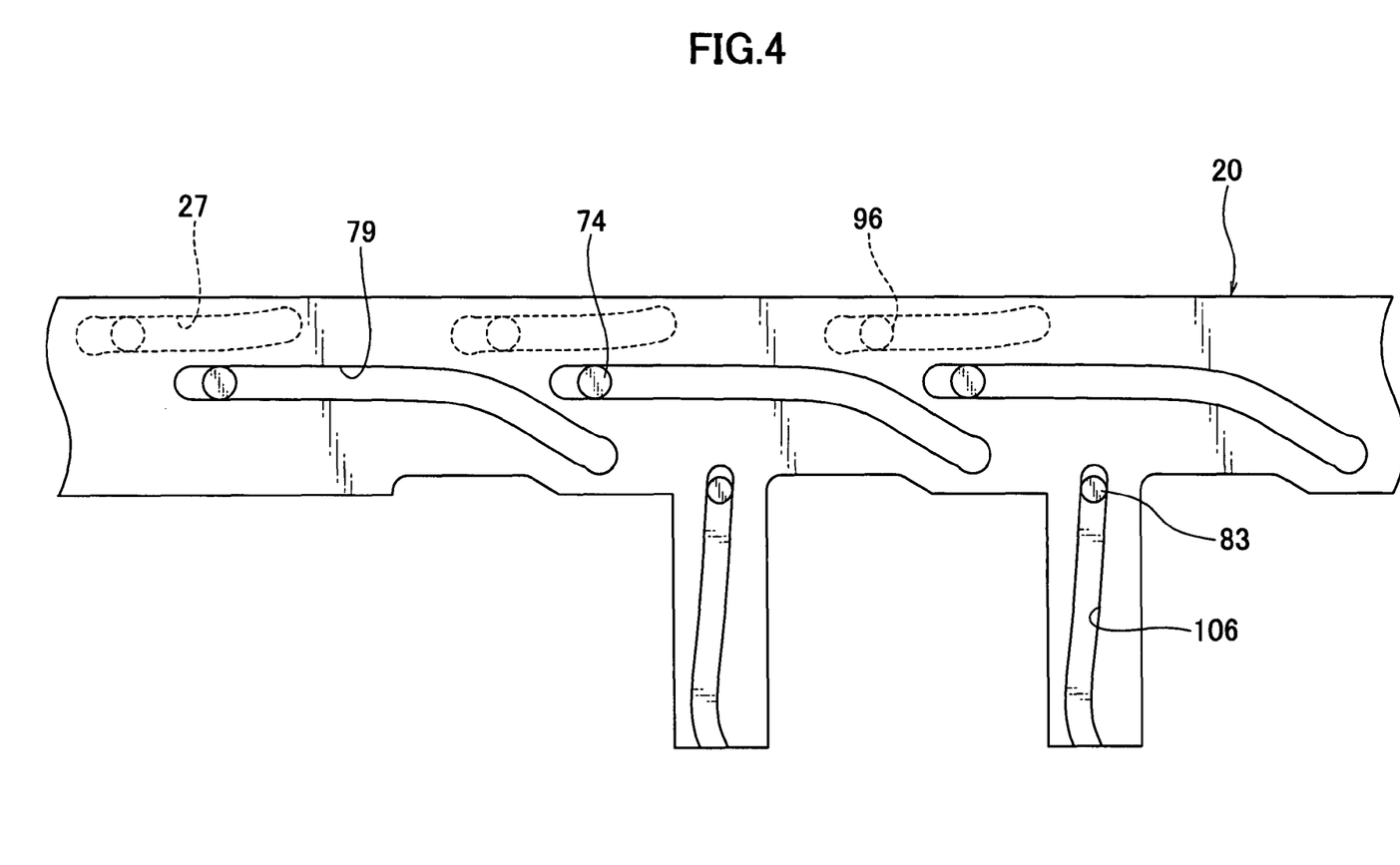
FIG. 4 is a view illustrating an exemplary first cam barrel according to the present invention, opened along a diameter and compressed.

The focusing cam barrel 20 has, as shown in FIG. 4, focus cams 27 in which 2nd-lens-group focus studs 96 are operatively fitted, focus cams 79 in which 2nd-lens-group focus studs 74 are operatively fitted, both of the cams being to shift the second lens group for the focusing, and focus cam grooves 106 in which the focus linkage studs 83 are operatively fitted.

Figure 5:
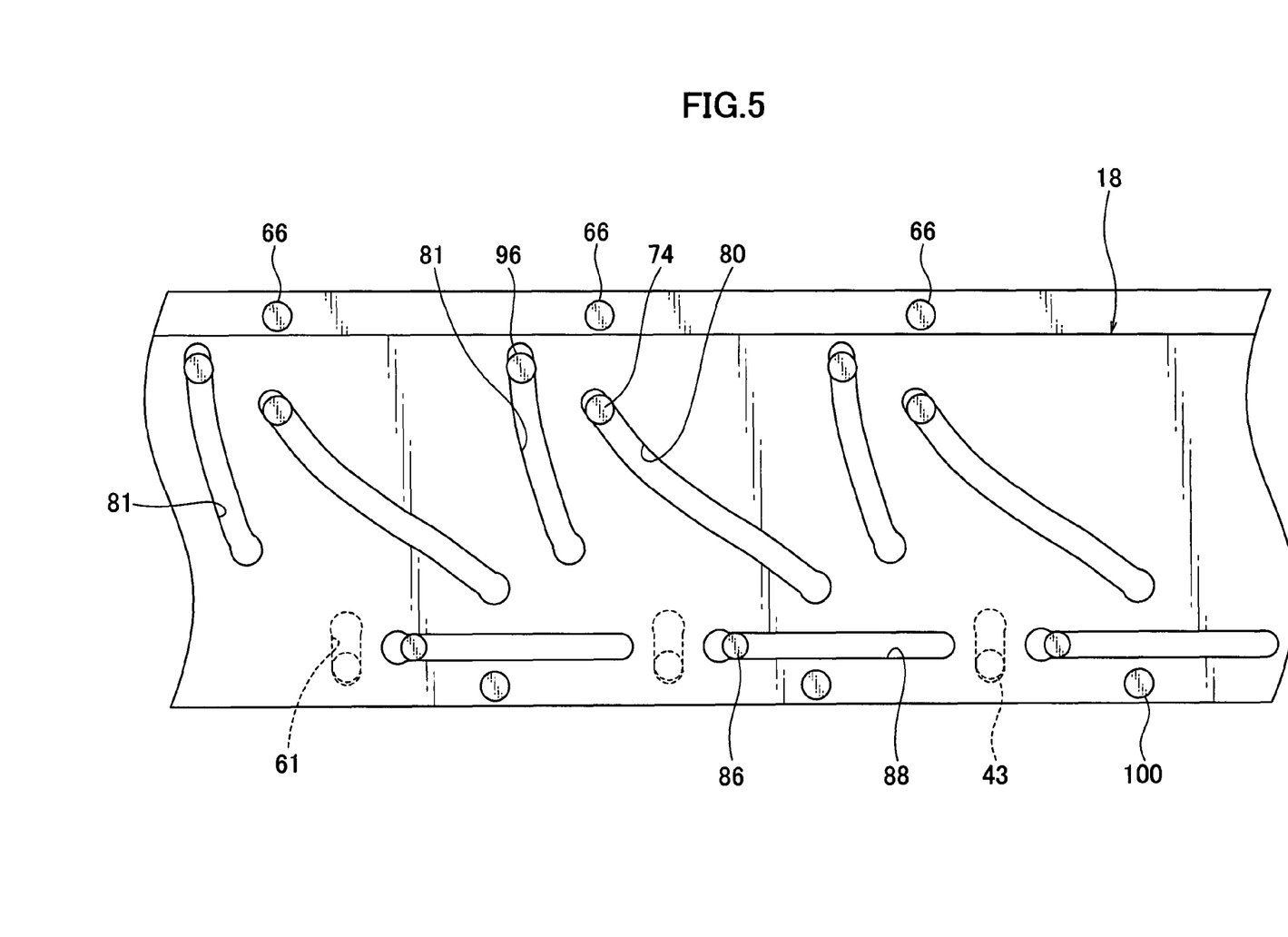
FIG. 5 is a view illustrating an exemplary linear shuttle barrel according to the present invention, opened along a diameter and compressed.

The linear shuttle barrel 18 has, as shown in FIG. 5, 2nd-lens-group guide cams 80 in which the 2nd-lens-group guide studs 74 are operatively fitted, 2nd-lens-group guide cams 81 in which the 2nd-lens-group focus studs 96 are operatively fitted, and 1st-cam barrel grooves 88 in which 1st-cam-barrel guide studs 86 implanted in the first cam barrel 16 are operatively fitted to rotate the first cam barrel. The linear shuttle barrel 18, which has the guide studs 100 implanted therein to guide it, is further provided with second longitudinal guide grooves 61 in which 3rd-lens-group guide studs 43 implanted in the 3rd-lens-group holding frame 3 are operatively fitted. The linear shuttle barrel 18 has studs 66 at its leading end to fit in lateral guide grooves 62 defined in the second cam barrel 22 and to slide the first lens group.

Figure 6:
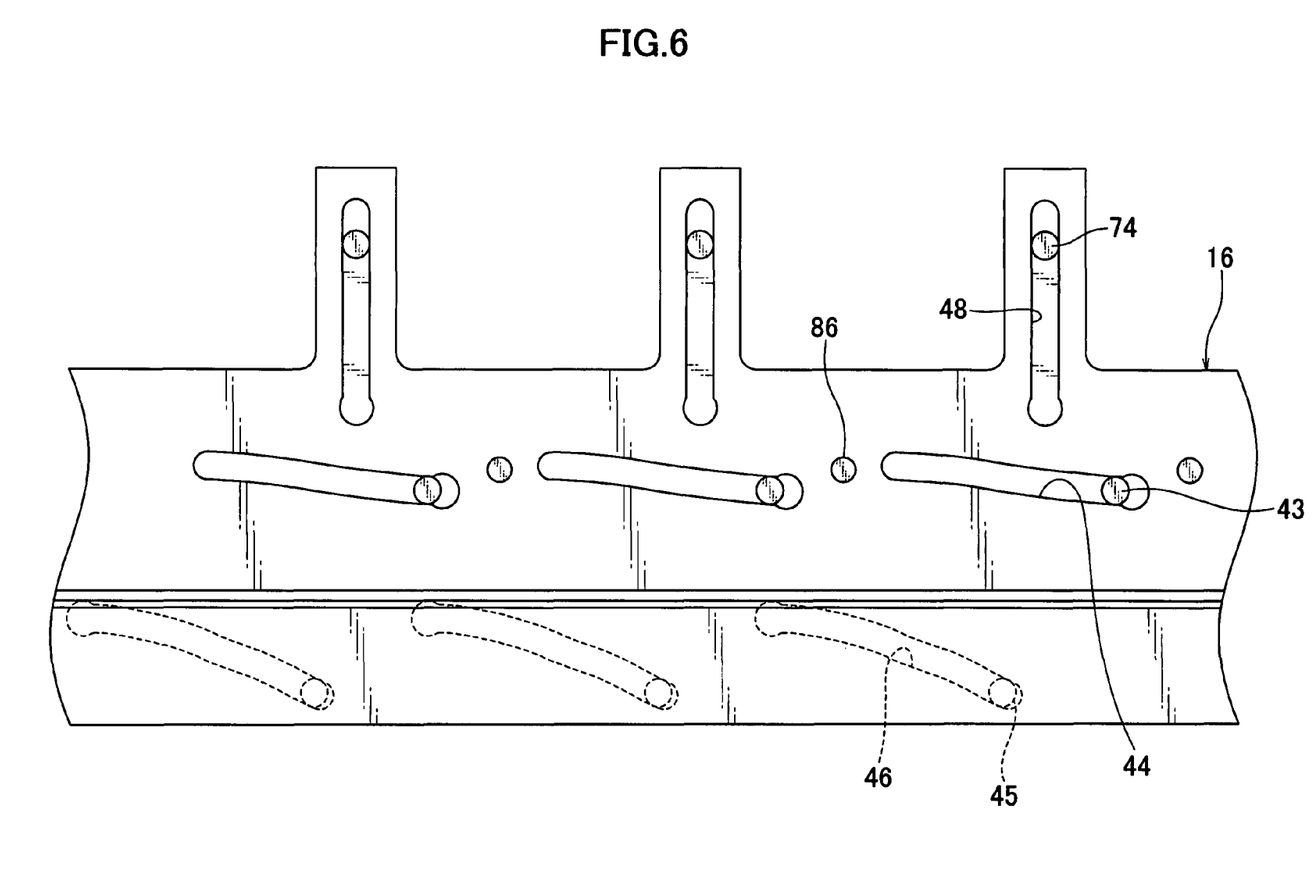
FIG. 6 is a view illustrating an exemplary focusing cam barrel according to the present invention, opened along a diameter and compressed.

As shown in FIG. 6, the first cam barrel 16, which has the 1st-cam-barrel guide studs 86 to rotate the first cam barrel, has 3rd-lens-group guide cams 44 in which the 3rd-lens-group guide studs 43 are operatively fitted, 4th-lens-group guide cams 46 in which 4th-lens-group guide studs 45 are operatively fitted, and third longitudinal guide grooves 48 in which the 2nd-lens-group guide studs 74 are operatively fitted.

Figure 7:
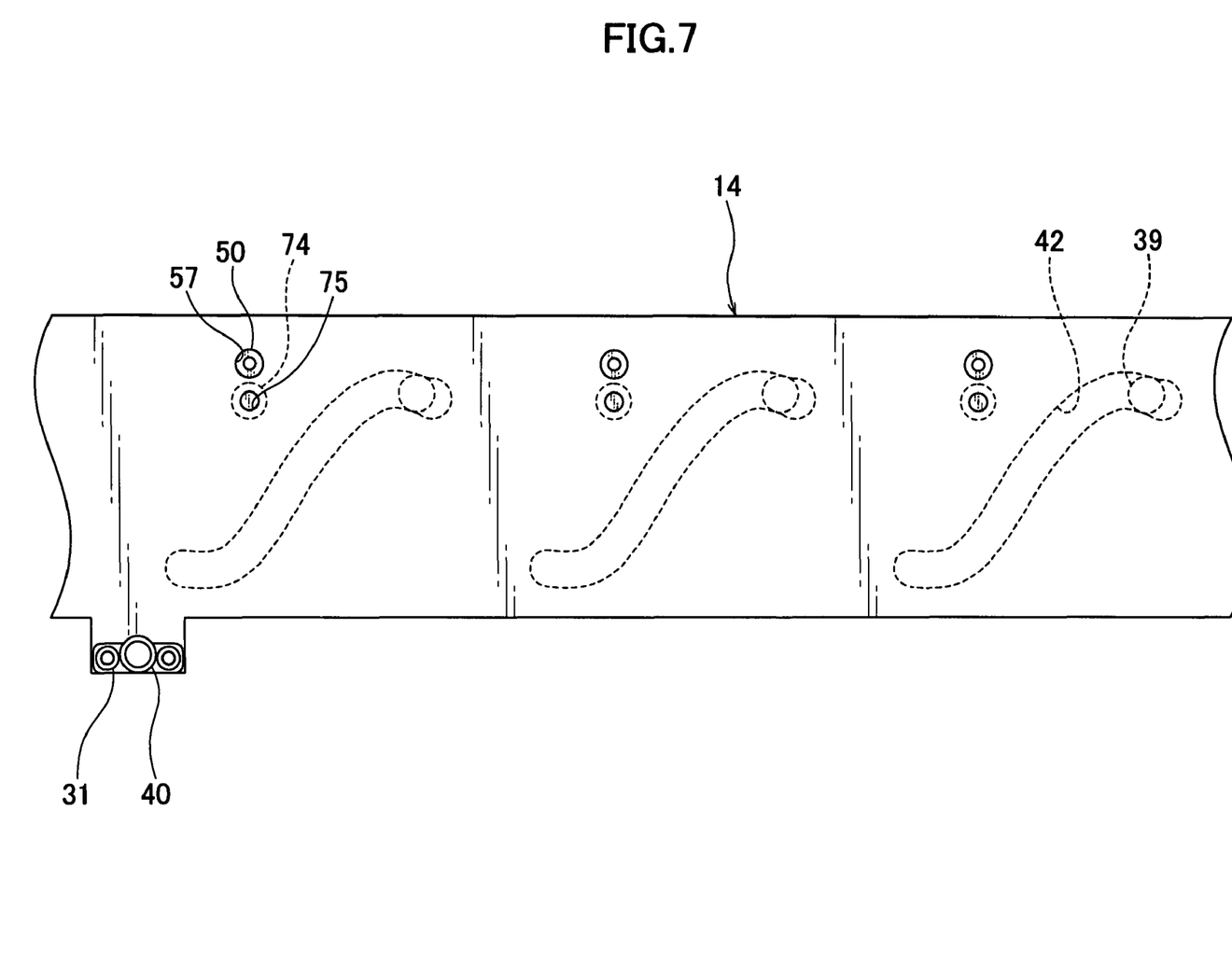
FIG. 7 is a view illustrating an exemplary zoom linkage ring according to the present invention, opened along a diameter and compressed.

The zoom linkage ring 14 has, as shown in FIG. 7, guide cams 42 in which the 1st-cam-barrel guide studs 30 implanted in the fixed barrel 12 are operatively fitted so as to guide the zoom linkage ring 14. Also, the zoom linkage ring 14 has first bores 57 in which guide studs 50 are implanted to guide the zoom linkage ring 14. In addition, the zoom linkage ring 14 has second bores 75 in which the 2nd-lens-guide studs 75 are implanted to guide the second lens group. The zoom linkage ring 14 further has zoom linkage posts 31 protruding toward the imaging field to which zoom linkage studs 40 are attached.

Figure 8:
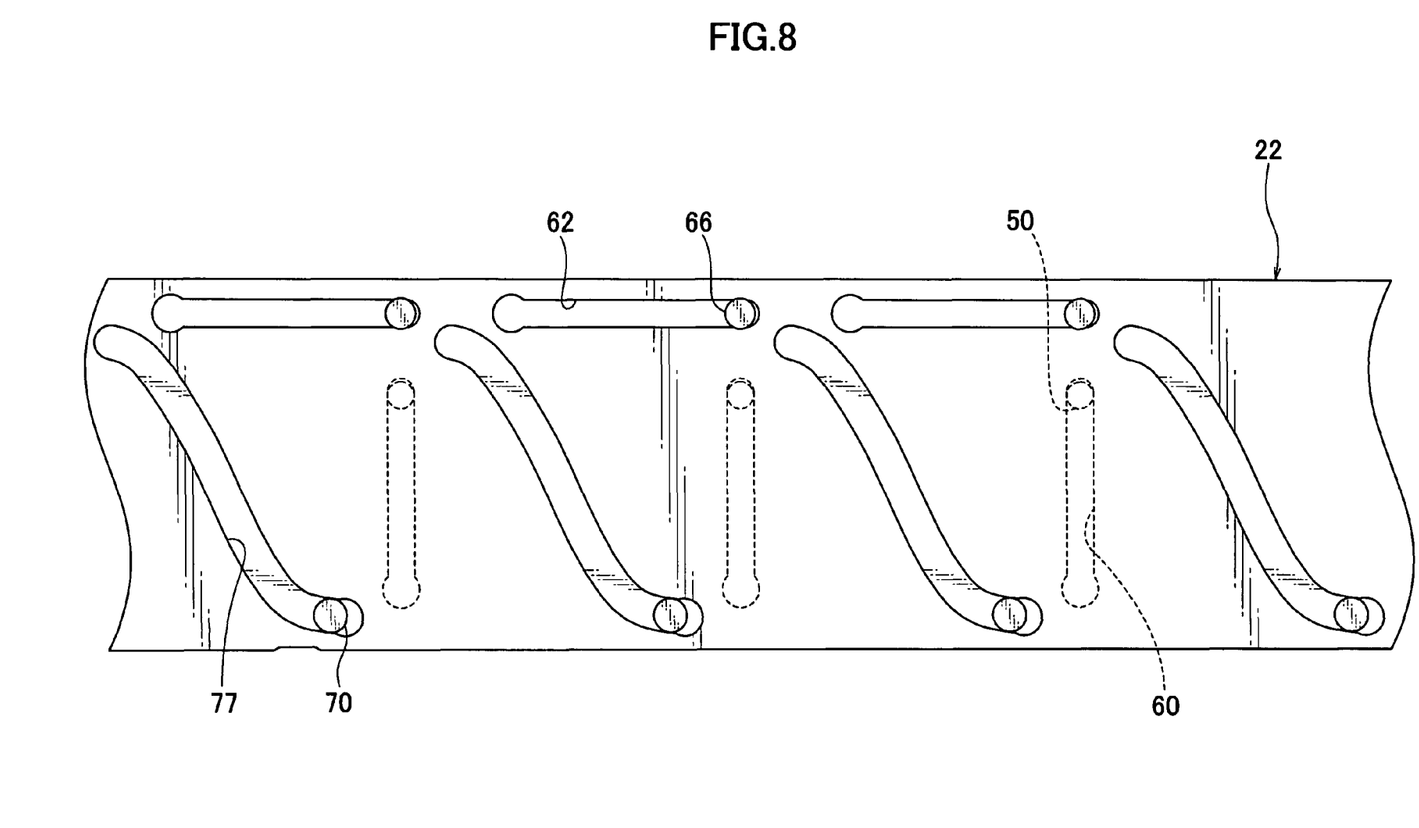
FIG. 8 is a view illustrating an exemplary second cam barrel according to the present invention, opened along a diameter and compressed.

The second cam barrel 22 has, as shown in FIG. 8, 1st-lens-group guide cams 77 in which 1st-lens-group guide studs 70 are operatively fitted, first longitudinal guide grooves 60 in which the guide studs 50 are operatively fitted to guide the zoom linkage ring 14, and lateral guide grooves 62 in which the studs 66 are fitted in to slide the first lens group.

Figure 9:
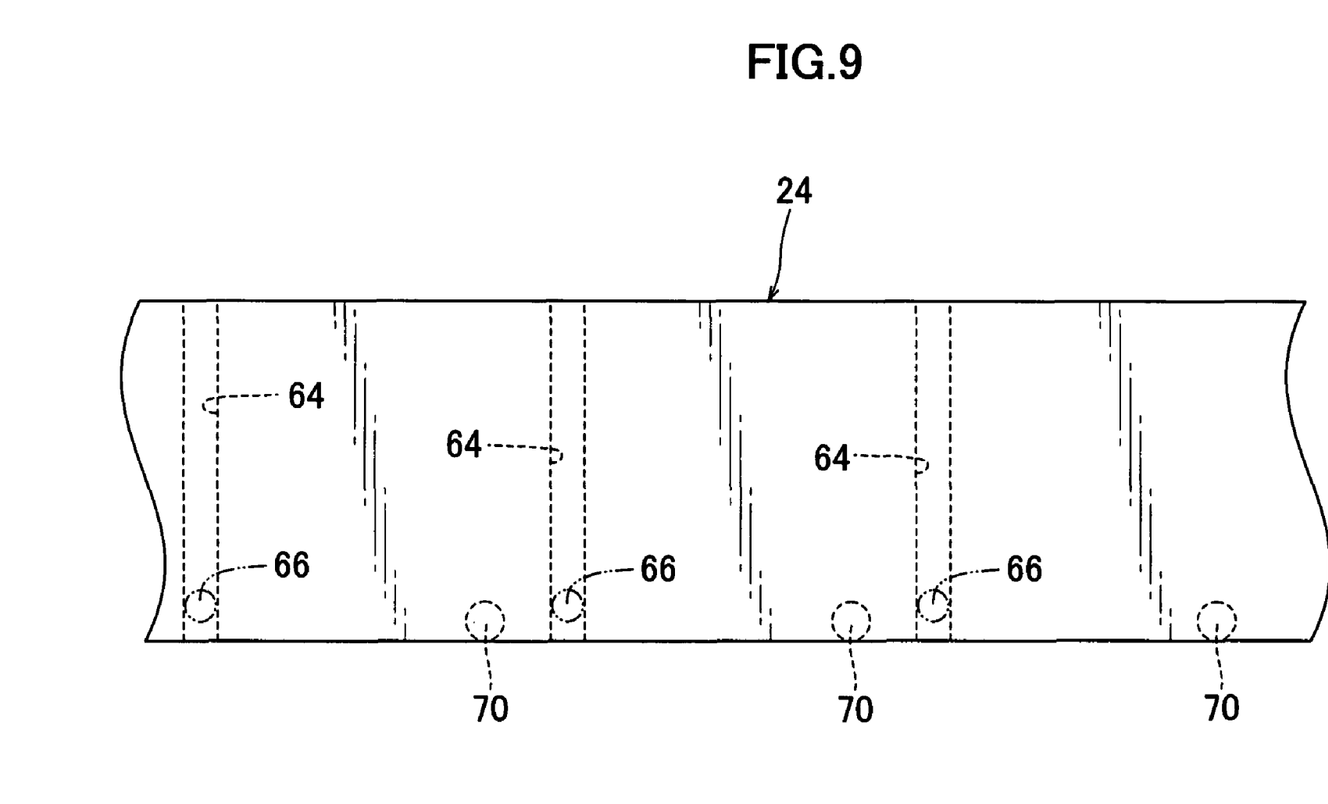
FIG. 9 is a view illustrating an exemplary 1st-lens-group sliding frame according to the present invention, opened along a diameter and compressed.

As can be seen in FIG. 9, the 1st-lens-group sliding frame 24 has its inner surface provided with third longitudinal guide grooves 64 in which the studs 66 are operatively fitted, and the 1st-lens-group guide studs 70 operatively fitted in the 1st-lens-group guide cams 77 defined in the second cam barrel 22.

<Zooming Operation>

With reference to FIG. 1 and FIG. 2, the zoom ring 30 is revolved for the zooming in and out. Rotation of the zoom ring 30 is transmitted to the zoom linkage ring 14 via the zoom linkage studs 40 fitted and sliding in the linear grooves (not shown) in parallel with the optical axis of the zoom ring 30 and via the zoom linkage posts 31.

When the zoom linkage ring 14 is revolved, the 1st-cam-barrel guide studs 39 implanted in the fixed barrel 12 fit and slide in the 1st-cam-barrel guide cams 42 to permit the zoom linkage ring 14 to move along the optical axis and rotate about the same.

The 2nd-lens-group guide studs 74 implanted inside the zoom linkage ring 14 fit and slide in the 2nd-lens-group focus cams 79 defined in the focus cam barrel 20, the 2nd-lens-group guide cams 80 in the linear shuttle barrel 18, and the third longitudinal guide grooves 48 in the first cam barrel 16. This permits the focus cam barrel 20 to move along the optical axis and rotate about it, the linear shuttle barrel 18 to linearly move along the optical axis, and the first cam barrel 16 to rotate.

The guide studs 50 implanted outside the zoom linkage ring 14 fit and slide the first longitudinal guide grooves 60 defined in the second cam barrel, which permits rotation of the zoom linkage ring 14 to be transmitted to the second cam barrel 22.

As for motions of the first lens group A during the zooming, the 1st-lens-group studs 66 fitted and sliding in the lateral guide grooves 62 enable the movement of the linear shuttle barrel 18 along the optical axis to be transmitted to the second cam barrel 22, and although the second cam barrel 22 itself is prevented from revolving, the 1st-lens-group guide studs 70 fitted and sliding in the 1st-lens-guide cams 77 defined in the second cam barrel 22 permit the 1st-lens-group sliding frame 24 to move along the optical axis over the second cam barrel 22.

As to motions of the second lens group B during he zooming, the second lens group B move along the optical axis and rotate about it as the 2nd-lens-group focus studs 96 of the 2nd-lens-group holding frame 2 do.

In order to implement the desired motions of the third lens group C during the zooming, the 3rd-lens-group guide studs 43 implanted in the 3rd-lens-group holding frame 3 fit and slide in the second longitudinal guide grooves 61 in the linear shuttle barrel 18 and the 3rd-lens-group guide cams 44 in the first cam barrel 16, and thus, permit the third lens group C to move along the optical axis.

As to motions of the fourth lens group D during the zooming, the 4th-lens-group guide studs 45 implanted in the 4th-lens-group holding frame 4 fit and slide the 4th-lens-group guide cams 46 defined in the first cam barrel 16, and the 4th-lens-group linear guide keys 112 are engaged with rotation stopper grooves (not shown) defined in the 4th-lens-group holding frame 4 in parallel with the optical axis, which permits the fourth lens group D to move along the optical axis.

<Focusing Operation>

With reference to FIG. 1 and FIG. 2, rotation of the focusing ring 28 is transmitted to the focus cam barrel 20 via a focus gear ring 94 and the focus linkage plate 102. Rotation of the focus cam barrel 20 is supported by the stationary 2nd-lens-group guide studs 74. Specifically, the 2nd-lens-group guide studs 74 fit and slide in the 2nd-lens-group focus cams 79 and the 2nd-lens-group guide cams 80 defined in the linear shuttle barrel 18 while the 2nd-lens-group focus studs 96 of the 2nd-lens-group holding frame 2 fit and slide in the 2nd-lens-group focus cams 27 and the 2nd-lens-group guide cams 81 defined in the linear shuttle barrel 18, which enables the focusing lens or the second lens group to move along the optical axis.

<Modified Version>

In the aforementioned preferred embodiment, the rotation of the 4th-lens-group holding frame 4 is restricted by the 4th-lens-group linear guide keys 112. The 4th-lens-group linear guide keys 112 may be replaced with a configuration where the linear shuttle barrel 18 is extended toward the imaging field so as to be engaged with the rotation stop grooves defined in the 4th-lens-group holding frame 4 in parallel with the optical axis.

What is claimed is:

1. An inner focusing zoom lens barrel, comprising:
an image-stabilization mechanism;
a fixed barrel;
a focusing cam barrel, a linear shuttle barrel, and a first cam barrel laid one over another in this order inside the fixed barrel; and
a zoom linkage ring, a second cam barrel, and a 1st-lens-group sliding barrel laid one over another in this order outside the fixed barrel;
wherein said first cam barrel has two guide cams which are located away from each other in the direction of the optical axis so that cylinders generated by rotation of the two guide cams around the optical axis do not superimpose on each other, and one of said guide cams guides the image-stabilization mechanism.

2. An inner focusing zoom lens barrel, comprising:
a fixed barrel;
a focusing cam barrel, a linear shuttle barrel, and a first cam barrel laid one over another in this order inside the fixed barrel, said first cam barrel having two guide cams which are located away from each other in the direction of the optical axis so that cylinders generated by rotation of the two guide cams around the optical axis do not superimpose on each other;
a zoom linkage ring, a second cam barrel, and a 1st-lens-group sliding barrel laid one over another in this order outside the fixed barrel; and
a lens system essentially consisting of a first group of lens pieces of positive refractivity, a second group of lens pieces of negative refractivity serving as a focusing lens, a third group of lens pieces of positive refractivity, and a fourth group of lens pieces of positive refractivity disposed in this order from the closest to the subject;
wherein as magnification changes from the wide-angle view to the telephoto view, the first lens group and the second lens group are separated farther from each other, the second lens group and the third lens group are moved closer to each other, and the third lens group and the fourth lens group are also moved closer to each other; and
wherein the trailing lens pieces in the third lens group are movable so as to be perpendicular to the optical axis, thereby enabling compensation for an unstable imaging plane due to a little jerk(s) of the hand(s).

3. The inner focusing zoom lens barrel according to claim 2, wherein:
the two guide cams of the first cam barrel guide the third and fourth lens groups, respectively;
the linear shuttle barrel has guide cams defined therein for guiding the second lens group;
the zoom linkage ring has guide cams defined therein for guiding the zoom linkage ring;
the second cam barrel has guide cams defined therein for guiding the first lens group; and
the focusing cam barrel has two separate sets of focusing cams defined therein for moving the second lens group for the focusing.

4. The inner focusing zoom lens barrel according to claim 1, wherein:
the first cam barrel, the focusing cam barrel, the linear shuttle barrel, the zoom linkage ring, and the second cam barrel are respectively movable along the optical axis and/or rotatable during the zooming; and
the focusing cam barrel is movable along the optical axis during the zooming while it is rotated during the focusing.

5. The inner focusing zoom lens barrel according to claim 2, wherein:
the first cam barrel, the focusing cam barrel, the linear shuttle barrel, the zoom linkage ring, and the second cam barrel are respectively movable along the optical axis and/or rotatable during the zooming; and
the focusing cam barrel is movable along the optical axis during the zooming while it is rotated during the focusing.

* * * * *